US011073688B2

(12) United States Patent
Anton et al.

(10) Patent No.: US 11,073,688 B2
(45) Date of Patent: Jul. 27, 2021

(54) VIRTUAL REALITY HEAD MOUNTED DISPLAY HAVING PLANAR FRESNEL SURFACE

(71) Applicant: STARBREEZE IP LUX II S.À R.L., Luxembourg (LU)

(72) Inventors: Lionel Anton, Paris (FR); David Batte, Bordeaux (FR)

(73) Assignee: STARBREEZE IP LUX II S.À R.L., Luxembourg (LU)

( * ) Notice: Subject to any disclaimer, the term of this patent is extended or adjusted under 35 U.S.C. 154(b) by 160 days.

(21) Appl. No.: 16/065,979

(22) PCT Filed: Jun. 29, 2016

(86) PCT No.: PCT/EP2016/065209
§ 371 (c)(1),
(2) Date: Jun. 25, 2018

(87) PCT Pub. No.: WO2017/108211
PCT Pub. Date: Jun. 29, 2017

(65) Prior Publication Data
US 2019/0049721 A1    Feb. 14, 2019

(30) Foreign Application Priority Data

Dec. 24, 2015  (LU) .......................................... 92 929
Feb. 1, 2016   (LU) .......................................... 92 966

(51) Int. Cl.
*G02B 3/08*      (2006.01)
*G02B 27/00*     (2006.01)
*G02B 27/01*     (2006.01)

(52) U.S. Cl.
CPC ........... *G02B 27/0081* (2013.01); *G02B 3/08* (2013.01); *G02B 27/0037* (2013.01);
(Continued)

(58) Field of Classification Search
CPC .... G02B 3/08; G02B 5/1876; G02B 27/0037; G02B 27/0081; G02B 2027/0123;
(Continued)

(56) References Cited

U.S. PATENT DOCUMENTS 5,161,057 A * 11/1992 Johnson .................... G02B 3/08
359/566
5,347,400 A    9/1994 Hunter
(Continued)

FOREIGN PATENT DOCUMENTS

CN    102193118 A    9/2011
EP     2372407 A2    10/2011

OTHER PUBLICATIONS

International Search Report dated Sep. 16, 2016 re: Application No. PCT/EP2015/065209, pp. 1-4, citing: U.S. Pat. No. 5,347,400 A, US 2002/181115 A1, US 2005/057805 A1, US 2013/051029 A1, US 2012/120498 A1 and U.S. Pat. No. 6,236,511 B1.
(Continued)

*Primary Examiner* — Ryan S Dunning
(74) *Attorney, Agent, or Firm* — Cantor Colburn LLP

(57) ABSTRACT

Head mounted display device for very large field of view virtual reality experience, adapted to be mounted on a user's head, the head mounted display device including at least on image display, at least two eyepieces associated to each of the user's eyes and arranged between the image display(s) and the location of one of the user's eyes, each eyepiece having at least one Fresnel surface, wherein the at least one Fresnel surface of each eyepiece is planar and is arranged at an angle below 70°, preferably at an angle between 45° and 70°, in particular at an angle between 50° and 67.5° relative to the on-axis field gaze direction and where the surface optical center of the at least one Fresnel surface is decentered relative to the on-axis field gaze direction.

11 Claims, 7 Drawing Sheets

(52) U.S. Cl.
CPC .. *G02B 27/0172* (2013.01); *G02B 2027/0123* (2013.01); *G02B 2027/0178* (2013.01)

(58) Field of Classification Search
CPC ........ G02B 27/0172; G02B 2027/0178; G03H 2001/0088; G03H 2223/23; G03H 2227/02
USPC ... 359/13, 14, 558, 566–576, 629–640, 742, 359/743
See application file for complete search history.

(56) References Cited

U.S. PATENT DOCUMENTS

| | | |
|---|---|---|
| 6,236,511 B1 | 5/2001 | Brown |
| 2002/0181115 A1 | 12/2002 | Massof et al. |
| 2005/0057805 A1 | 3/2005 | Lee |
| 2012/0120498 A1 | 5/2012 | Harrison et al. |
| 2013/0051029 A1 | 2/2013 | Suzuki et al. |
| 2016/0011419 A1* | 1/2016 | Gao .................. G02B 27/0172 359/471 |

OTHER PUBLICATIONS

Written Opinion dated Sep. 16, 2016 re: Application No. PCT/EP2015/065209, pp. 1-6, citing: U.S. Pat. No. 5,347,400 A, US 2002/181115 A1, US 2005/057805 A1, US 2013/051029 A1, US 2012/120498 A1 and U.S. Pat. No. 6,236,511 B1.

CN Office Action dated Feb. 3, 2020 re: Application No. 201680075756.X, pp. 1-15, citing: U.S. Pat. No. 5,347,400 A, CN 102193118 A and US 2002181115 A1.

\* cited by examiner

VIRTUAL REALITY HEAD MOUNTED DISPLAY HAVING PLANAR FRESNEL SURFACE

TECHNICAL FIELD

The present disclosure generally relates to virtual reality technology and in particular to head mounted displays providing an improved immersive effect to the user.

BACKGROUND ART

In virtual reality, in order to obtain a full immersive effect, it is mandatory to use an apparatus providing a large field of view and a high image quality. Ideally, the field of view should cover the whole human field of view including the binocular stereoscopic and peripheral field of view, taking into account the range of rotation of the eyeballs.

There are however a number of constraints which render some known or theoretical solutions impractical. Indeed, a head mounted display should provide as much comfort as possible to the user, which means that it must not be too bulky, heavy or unbalanced. Although large displays and/or complex lens systems would a priori allow for a large field of view and high image quality, the immersive effect would suffer from the discomfort generated by such head mounted displays. Actually, the weight of the components is not only largely located in the front part of the head mounted display, but also deported at a distance before the user's eyes which adds to the inertia and discomfort of the assembly.

Furthermore, such configurations would also have economical drawbacks in that the required expensive components would render such head mounted displays improper to general consumer markets.

BRIEF SUMMARY

The disclosure provides head mounted displays which do provide a very large field of view and a high image quality while being relatively light-weight and comfortable to wear. Moreover, the head mounted display should use parts which allow for economical manufacturing and assembly, while providing good visual immersive effect to the user.

The present disclosure proposes a head mounted display device for very large field of view virtual reality experience, adapted to be mounted on a user's head, the head mounted display device comprising
at least one image display, preferably at least two and most preferably two image displays, i.e. one image display for each of the user's eyes,
at least two eyepieces associated to each of the user's eyes and arranged between the image display(s) and the location of one of the user's eyes, each eyepiece comprising at least one optical component and among the optical components one of them comprising at least one Fresnel surface,
wherein said at least one Fresnel surface of each eyepiece is planar and is arranged at an angle below 70°, preferably at an angle between 45° and 70°, in particular at an angle between 50° and 67.5° relative to an on-axis field gaze direction, this direction being normal or perpendicular to a line comprising centers of both of the user's eyes, and
wherein the surface optical center of said at least one Fresnel surface is decentered relative to the aforementioned on-axis field gaze direction.
The at least one Fresnel surface of each eyepiece is oriented such that the outer or temporal side thereof is closer or bisects the line comprising the centers of both of the user's eyes. The approximate field of view of an individual human eye (measured from the fixation point, i.e., the point at which one's gaze is directed) is 60° superior (up), 60° nasal (towards the nose), 70-75° inferior (down), and 100-110° temporal (away from the nose and towards the temple). For both eyes the combined visual field is 130-135° vertical and 200° horizontal. Hence, the at least one Fresnel surface of each eyepiece preferably extends laterally on temporal (outer) and nasal (inner) side such as to cover at least 90%, preferably at least 95% of the user's field of view of the corresponding eye. Furthermore, the at least one Fresnel surface of each eyepiece preferably extends vertically on upper and lower side such as to cover at least 90%, preferably at least 95% of the user's field of view of the corresponding eye. The lateral and/or vertical extension of each Fresnel surface may even preferably represent 100% or more of the user's field of view of the corresponding eye.

The at least one Fresnel surface of each eyepiece is generally arranged such as to redirect the light emitted by the image display(s) towards the corresponding eye of the user. The at least one Fresnel surface, either alone or in combination with one or more further Fresnel surfaces (see also below), may further be arranged so as to generate collimated light rays from the image display(s) pixels towards the corresponding eye of the user.

The particular type of the Fresnel surface(s) in each eyepiece depends on the chosen overall configuration; preferably they are spherical, aspherical or non-rotationally symmetric.

The at least one Fresnel surface is made of any appropriate material, preferably of glass or plastic, the latter being particularly preferred because it allows for a lighter optical assembly. The manufacturing of said Fresnel surfaces can be done by molding and/or by machining, preferably by compression molding, by injection molding, by diamond machining or by a combination thereof. Compression molding is particularly preferred as the resulting Fresnel surfaces present an even better surface quality and thus reduce stray light and enhance general image quality.

A head mounted display device of the disclosure thus comprises two eyepieces, each of which may consist in one single optical component comprising one or two Fresnel surfaces. Alternatively, each eyepiece may consist in two optical components comprising between one and four Fresnel surfaces. Other arrangements or combinations even with non-Fresnel surface optical elements are however possible if desired or required.

In a head mounted display device of the disclosure, the plane of the Fresnel surface and the plane of the (corresponding) image display may be parallel. In certain preferred embodiments, the eyepiece and the image plane are however not parallel, but rather tilted by a certain angle relative to each other. Such a tilt may preferably be useful to average through the field of view the on-axis and the off-axis optical aberrations. This angle will generally be chosen to be between 0.1 and 15°, preferably between 0.5 and 10°, more preferably between 1 and 5°.

Compared to a conventional plano-convex lens, the Fresnel surface simulates the shape of the conventional lens using individual facets limited from one another by (more or less upright) ridges or grooves—each facet containing a portion of the lens's overall figure. In the context of the disclosure, the expression Fresnel surface may be a lens with one such facetted surface. If two such Fresnel surfaces are considered for the same eyepiece, they may be located on either side of a single Fresnel lens or on two Fresnel lenses, in which latter case the other surface is not facetted and generally is entirely smooth or consist in a non Fresnel optical surface. In preferred embodiments, the Fresnel surface(s) grooves are parallel to the chief rays going from the image display to the eye center of rotation. Furthermore, the term "planar" in the context of the Fresnel surface, refers of course to the overall shape of the optic element not to the facetted surface as such. In the context of the present disclosure, the term planar means that the lens comprising the Fresnel surface is (macroscopically) flat or nearly flat, i.e. it may be slightly arched to better adapt to the shape of the user's head and thereby allow for further reducing the dimensions of the head mounted display device.

The surfaces of the optical components can be either Fresnel, refractive, diffractive or hybrid refractive-diffractive surfaces or any combination of them with at least one Fresnel surface.

The non Fresnel optical surfaces of the optical components can be a specific diffractive surface in order to reduce the chromatic aberration.

As a conclusion, due to the particular positioning of the Fresnel surfaces relative to the user's eye and the optical center being decentered with respect to the on-axis field gaze direction, head mounted display devices of the disclosure allow for a large field of view of 180° or more, while maintaining a high level of image quality. Indeed, existing head mounted display optical systems are generally able either to provide a limited field of view, i.e. 90° to 110° with a good image quality using either conventional or Fresnel lenses, or a low image quality with a larger field of view (up to 150°) using either conventional or Fresnel lenses.

The image display(s) may be of any appropriate type, be it LCD, LED, OLED, AMOLED, etc. The image displays are preferably flat (planar), although this is not mandatory. Furthermore, it is clear that the resolution must be sufficient high to provide for the realistic images needed for an adequate virtual reality experience. It is important to note that the size of the image display does not need to cover the whole field of view (of one eye if each eye is provided with images from a separate display). Indeed, as the at least Fresnel surface is preferably sized to cover (almost all of) the field of view, the facets thereof are adapted to redirect the light rays to the user's eye.

Prior to the current disclosure, there was no existing Fresnel based optical system providing such a large field of view (superior or equal to 180°) and a high fidelity image quality.

Hence, the advantages of the head mounted display devices achievable with the disclosure are an extremely wide field of view superior or equal to 180°, i.e. 210°, a higher image quality, i.e. better contrast and less stray light, as well as a compact and light-weight design due to the flat Fresnel surface lenses as described herein.

BRIEF DESCRIPTION OF THE DRAWINGS

Preferred embodiments of the disclosure will now be described, by way of example, with reference to the accompanying drawings in which.

Further details and advantages of the present disclosure will be apparent from the following detailed description of several not limiting embodiments with reference to the attached drawings.

DESCRIPTION OF PREFERRED EMBODIMENTS

Figure 1:
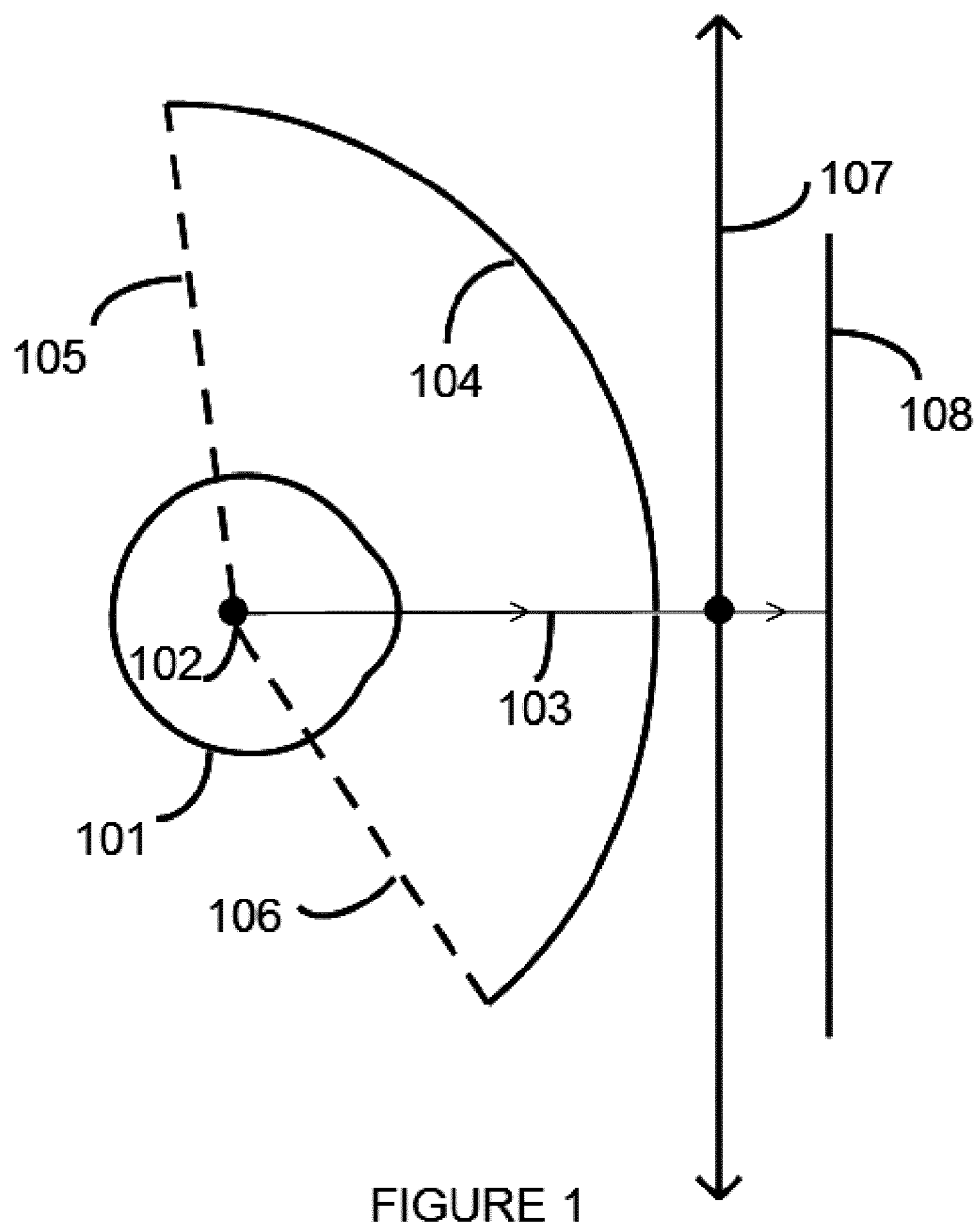
FIG. 1 is a schematic representation of a known prior art solution.

FIG. 1 presents a known solution for head mounted displays. The eye 101 of a user is able to rotate an angle around its center of rotation 102. The eyepiece 104 includes a surface 104 which is curved around the eye. The on-axis field gaze direction 103 goes through the curved surface 104, the center of the eyepiece 107 and reaches the display 108. The curved surface 104 enables a very large wide field of view. The field of view on the temporal side of the head 105 is greater than the field of view on the nasal side 106.

Figure 2:
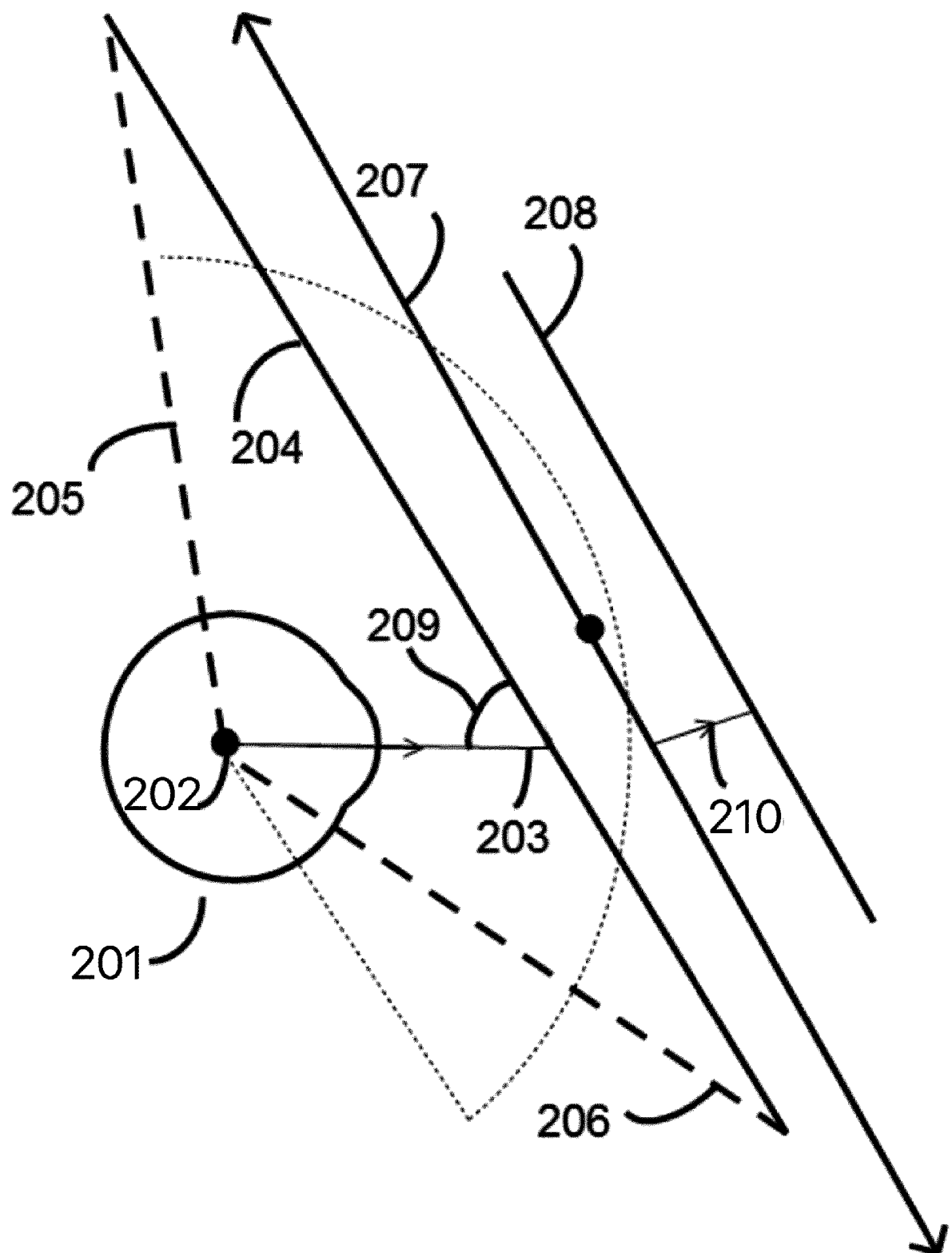
FIG. 2 is a schematic representation of a preferred embodiment of the present disclosure (only the left eye and a left part of the device being represented, viewed from the top)

FIG. 2 describes a first embodiment according to the present disclosure. As described above, the eye 201 may turn around its center of rotation 202. The eyepiece 207 includes a flat or nearly flat Fresnel surface 204 which is tilted by an angle 209 of at most 70° relative to the on-axis field gaze direction. The on-axis field gaze direction 203 goes through the flat surface 204. The eyepiece optical center is decentered relative to on-axis field gaze direction. The gaze direction 203 is deviated 210 and reaches the display 208. The tilt angle 209 enables an extremely wide field of view. The field of view on the temporal side of the head 205 is greater than the field of view on the nasal side 206.

Figure 3:
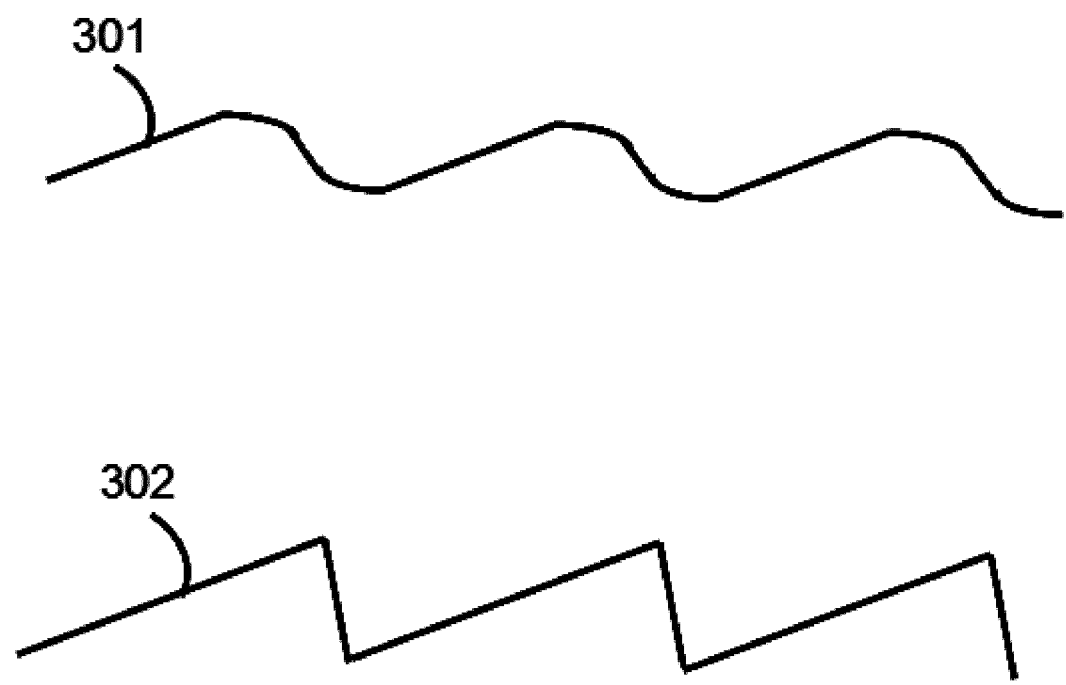
FIG. 3 is a schematic of two cross-sections through Fresnel surfaces with different optical qualities.

FIG. 3 presents cross sections of Fresnel surface produced by molding. The surface 301 is a cross section of a surface produced by injection molding. The surface 302 is a cross section produced by compression molding. The better surface quality of compression molding enables a higher image quality and less stray light.

Figure 4:
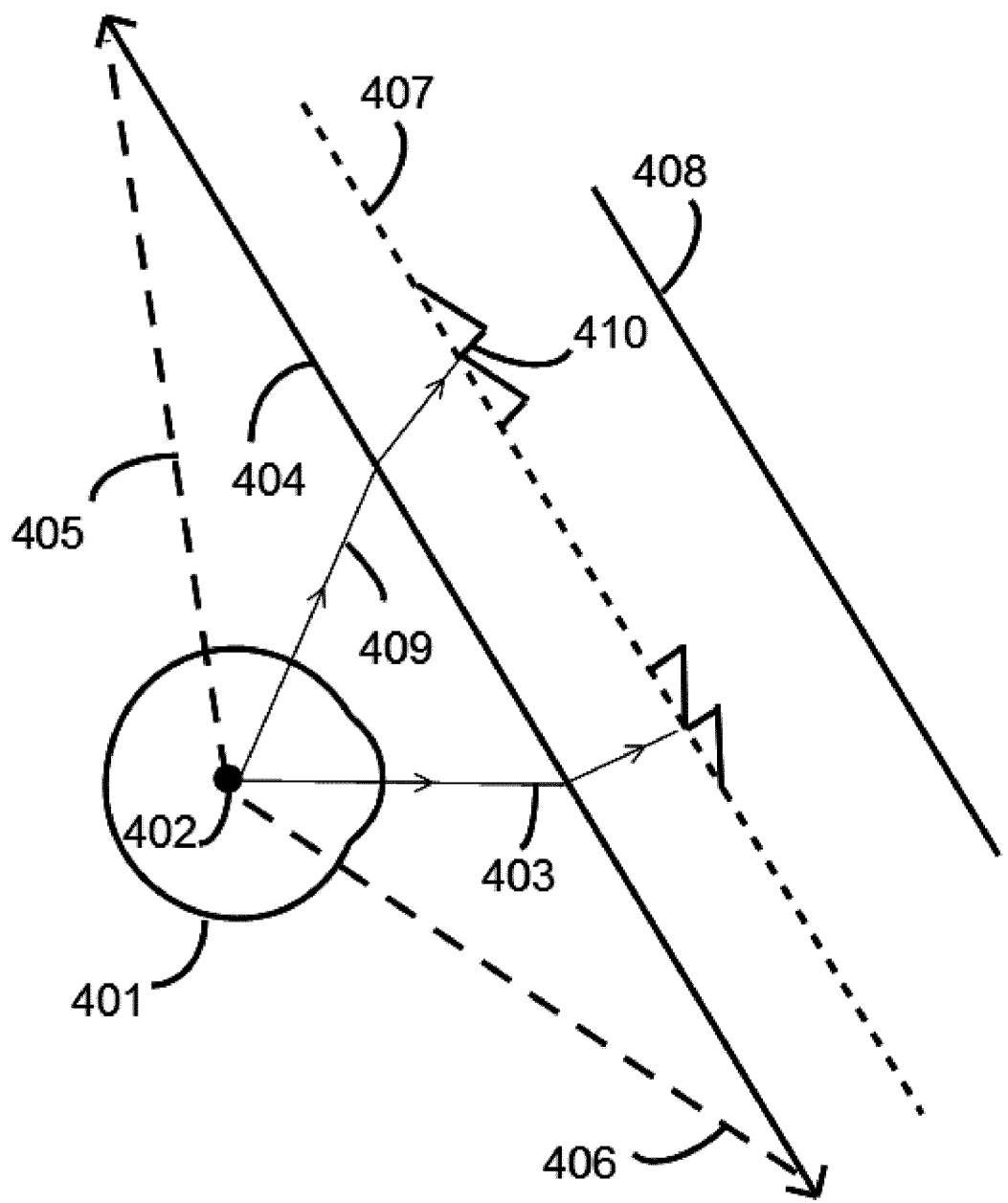
FIG. 4 is a schematic representation of another preferred embodiment of the present disclosure (again only the left eye and a left part of the device being represented, viewed from the top) showing more particularly some of the facets and grooves of the Fresnel surface (not to scale)

FIG. 4 presents a configuration of the disclosure in which the groove's flat surface 410 of Fresnel surface(s) are oriented parallel to the chief rays. FIG. 4 shows two chief rays 403 and 409 which correspond to two field angles of view. This rule could be applied whatever the Fresnel surface position is.

Figure 5:
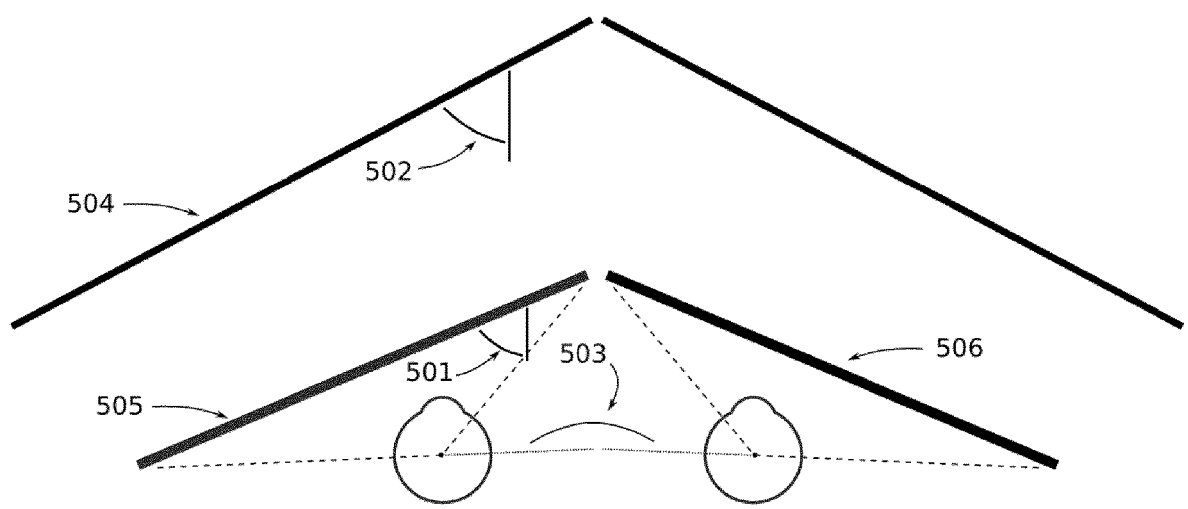
FIG. 5 is a schematic representation of still another preferred embodiment of the present disclosure, wherein the image displays and the corresponding Fresnel surfaces are not parallel relative to each other.

FIG. 5 presents a configuration of the disclosure in which the eyepiece 505 and the display 504 tilt angles respectively 501 and 502 are different to accommodate to the field curvature of the eyepiece 505, astigmatism aberration and other optical aberrations. The result is an improved focus in the nasal region of the field of view and therefore a better overall image quality. In addition, the configuration of the left eyepiece 505 and right eyepiece 506 allows the extremely wide field of view 503 superior to 180°.

Figure 6:
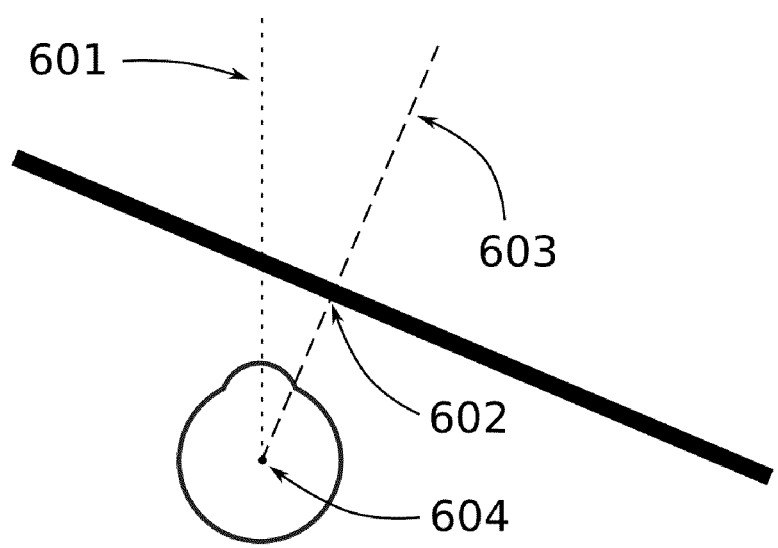
FIG. 6 is a schematic representation of a preferred embodiment of the present disclosure showing the decentering of the optical center (only the right eye and the right eyepiece of the device being represented, viewed from the top)

FIG. 6 presents a configuration of the disclosure in which the optical center 602 of the eyepiece is decentered relative to the on-axis field gaze direction 601. While for other virtual reality headset in prior art the optical axis is 603 is strictly aligned with the on-axis field gaze direction 601, in our configuration the optical center 602 is decentered toward the external side so that the eye rotation center 604 remains on the optical axis 603 in spite of the tilt applied. This configuration is specific to the present disclosure and allows an optimal image quality consistency within the entire pupil rotation range. Any other configuration will not allow reaching this level of quality.

Figure 7:
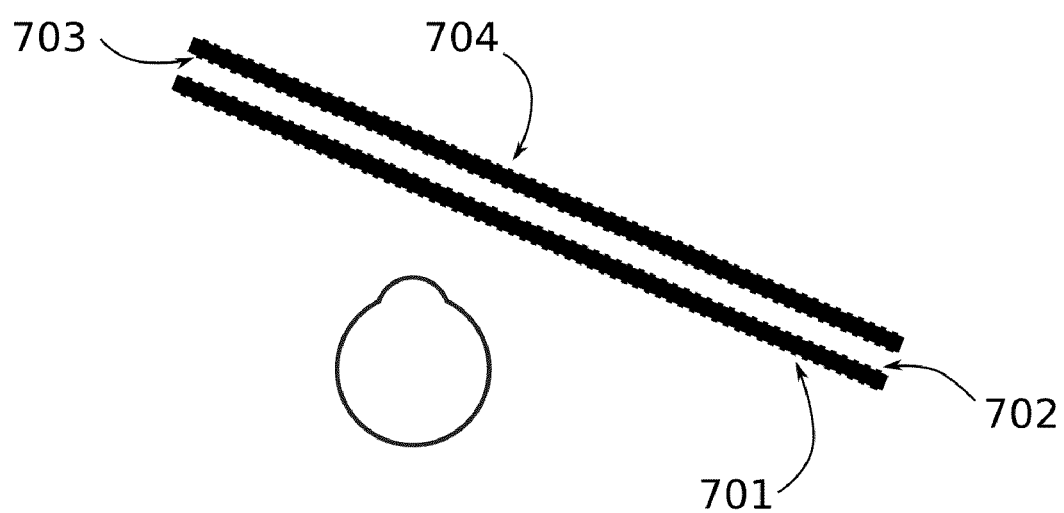
FIG. 7 is a schematic representation of a preferred embodiment of the present disclosure showing two optical components comprising four optical surfaces (only the right eye and the right eyepiece of the device being represented, viewed from the top).

FIG. 7 presents a configuration of the disclosure in which the eyepiece comprises four optical surfaces 701, 702, 703 and 704 on two optical elements. Those surfaces can be either Fresnel, refractive, diffractive or hybrid refractive-diffractive surfaces or any combination of them with at least one Fresnel surface.

The invention claimed is:

1. A head mounted display device for very large field of view virtual reality experience, adapted to be mounted on a user's head, the head mounted display device comprising
    at least one image display,
    at least two eyepieces associated to each one of the user's eyes and arranged between the image display(s) and the location of one of the user's eyes, each eyepiece comprising at least one optical component and among the optical components one of them comprising at least one Fresnel surface,
    wherein said at least one Fresnel surface of each eyepiece is flat or nearly flat,
    wherein said at least one Fresnel surface of each eyepiece is planar and is arranged at an angle below 70° relative to the on-axis field gaze direction and wherein the surface optical center of said at least one Fresnel surface is decentered relative to the on-axis field gaze direction,
    wherein the plane of the eyepiece and the plane of the image display are parallel.

2. The head mounted display device as claimed in claim 1, wherein the at least one Fresnel surface of each eyepiece extends laterally from temporal to nasal sides such as to cover at least 90% of the user's field of view of the corresponding eye.

3. The head mounted display device as claimed in claim 1, wherein the at least one Fresnel surface of each eyepiece extends vertically from upper to lower sides such as to cover at least 90% of the user's field of view of the corresponding eye.

4. The head mounted display device as claimed in claim 1, wherein the Fresnel surface(s) are spherical, aspherical or non-rotationally symmetric.

5. The head mounted display device as claimed in claim 1, wherein said at least one Fresnel surface is made of glass or plastic.

6. The head mounted display device as claimed in claim 1, wherein said at least one Fresnel surface is produced by molding and/or by machining.

7. The head mounted display device as claimed in claim 1, wherein each eyepiece comprises one single optical component comprising one or two Fresnel surfaces.

8. The head mounted display device as claimed in claim 1, wherein each eyepiece comprises two optical components comprising between one and four Fresnel surfaces.

9. The head mounted display device as claimed in claim 1, wherein the Fresnel surface(s) grooves are parallel to the chief rays going from the image display to the eye center of rotation.

10. The head mounted display device as claimed in claim 1, wherein one or more surfaces of the optical components is a specific diffractive surface in order to reduce chromatic aberration.

11. The head mounted display device as claimed in claim 1, wherein the surfaces of the optical components can be either Fresnel, refractive, diffractive or hybrid refractive-diffractive surfaces or any combination of them with at least one Fresnel surface.

* * * * *